United States Patent
Wang et al.

(10) Patent No.: US 12,374,089 B2
(45) Date of Patent: Jul. 29, 2025

(54) METHOD, DEVICE, AND COMPUTER PROGRAM PRODUCT FOR IMAGE PROCESSING

(71) Applicant: Dell Products L.P., Round Rock, TX (US)

(72) Inventors: Zijia Wang, WeiFang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 419 days.

(21) Appl. No.: 17/890,391

(22) Filed: Aug. 18, 2022

(65) Prior Publication Data
US 2024/0029416 A1    Jan. 25, 2024

(30) Foreign Application Priority Data
Jul. 22, 2022    (CN) .......................... 202210874440.4

(51) Int. Cl.
| | | |
|---|---|---|
| *G06V 10/774* | (2022.01) | |
| *G06T 7/00* | (2017.01) | |
| *G06V 10/82* | (2022.01) | |

(52) U.S. Cl.
CPC ........ *G06V 10/7747* (2022.01); *G06T 7/0002* (2013.01); *G06V 10/82* (2022.01)

(58) Field of Classification Search
CPC .... G06V 10/7747; G06V 10/82; G06V 20/56; G06V 10/772; G06V 10/774; G06V 10/993; G06T 7/0002; G06T 2207/20081; G06T 2207/20084; G06T 2207/30168; G06F 3/0608
See application file for complete search history.

(56) References Cited

U.S. PATENT DOCUMENTS

| | | | |
|---|---|---|---|
| 9,922,261 B2 * | 3/2018 | Isler .......................... | G06T 7/62 |
| 10,891,550 B2 * | 1/2021 | Kapur .................... | G06N 20/00 |
| 11,568,634 B2 * | 1/2023 | Jonnalagedda ........ | G06V 10/20 |

(Continued)

FOREIGN PATENT DOCUMENTS

| | | | | |
|---|---|---|---|---|
| CA | 3225437 A1 * | 12/2022 | ......... | G06F 18/2178 |

OTHER PUBLICATIONS

Wang, Tongzhou, et al. "Dataset distillation." arXiv preprint arXiv:1811.10959 (Year: 2018).*

(Continued)

*Primary Examiner* — Zhiyu Lu
(74) *Attorney, Agent, or Firm* — Ryan, Mason & Lewis, LLP (57) ABSTRACT

Embodiments of the present disclosure relate to a method, a device, and a computer program product for image processing. The method includes determining a group of composite images, a composite image in the group of composite images being composited from images of the same type in a plurality of images. The method further includes determining an image quality of an acquired target image based on the group of composite images. The method further includes processing the acquired target image based on the image quality. Through the method, the storage and management of image data are improved, the effective utilization rate of data is improved, and the consumption of resources is reduced.

20 Claims, 6 Drawing Sheets

(56) References Cited

U.S. PATENT DOCUMENTS

| | | | | |
|---|---|---|---|---|
| 11,616,988 | B2* | 3/2023 | Dinh | G06N 3/02 |
| | | | | 375/240.26 |
| 12,119,088 | B2* | 10/2024 | Jaganathan | G06F 18/23211 |
| 2016/0210529 | A1* | 7/2016 | Nishiyuki | G06V 10/44 |
| 2018/0189602 | A1* | 7/2018 | Hellier | G06V 10/763 |
| 2018/0204111 | A1* | 7/2018 | Zadeh | G06V 10/764 |
| 2018/0260665 | A1* | 9/2018 | Zhang | G06F 18/22 |
| 2020/0302224 | A1* | 9/2020 | Jaganathan | G06F 18/217 |
| 2021/0097699 | A1* | 4/2021 | Li | H04W 24/08 |
| 2021/0390696 | A1* | 12/2021 | Iwase | H04N 7/183 |
| 2021/0398259 | A1* | 12/2021 | Yamazoe | G06N 3/084 |
| 2024/0404004 | A1* | 12/2024 | Kim | G06N 3/047 |

OTHER PUBLICATIONS

Tung, Frederick, and Greg Mori. "Similarity-preserving knowledge distillation." Proceedings of the IEEE/CVF international conference on computer vision. (Year: 2019).*

M. Aumueller et al., "ANN-Benchmarks," http://ann-benchmarks.com/, Accessed Jul. 21, 2022, 25 pages.

O. Zendel et al., "Analyzing Computer Vision Data—The Good, the Bad and the Ugly," IEEE Conference on Computer Vision and Pattern Recognition, Jul. 1, 2017, pp. 1980-1990.

D. J. Butler et al., "A Naturalistic Open Source Movie for Optical Flow Evaluation," European Conference on Computer Vision, Part IV, LNCS 7577, Oct. 2012, pp. 611-625.

C. Kaner, "What Is a Good Test Case?" Star East, May 2003, 16 pages.

P. Dollar et al., "Pedestrian Detection: A Benchmark," Conference on Computer Vision and Pattern Recognition, Jun. 2009, 8 pages.

V. Haltakov et al., "Framework for Generation of Synthetic Ground Truth Data for Driver Assistance Applications," German Conference on Pattern Recognition, Sep. 2013, 10 pages.

M. Kristan et al., "A Novel Performance Evaluation Methodology for Single-Target Trackers," IEEE Transactions on Pattern Analysis and Machine Intelligence, arXiv:1503.01313v3, Jan. 8, 2016, 21 pages.

A. Li et al., "NUS-PRO: A New Visual Tracking Challenge," IEEE Transactions on Pattern Analysis and Machine Intelligence, vol. 38, No. 2, Feb. 2016, pp. 335-347.

N. Onkarappa et al., "Synthetic Sequences and Ground-truth Flow Field Generation for Algorithm Validation," Multimedia Tools and Applications, vol. 74, No. 9, May 2015, pp. 3121-3135.

G. Ros et al., "The Synthia Dataset: A Large Collection of Synthetic Images for Semantic Segmentation of Urban Scenes," Conference on Computer Vision and Pattern Recognition. Jun. 2016, pp. 3234-3243.

G. S. Semwezi, "Automation of Negative Testing," Master of Science Thesis, Chalmers University of Technology, Jun. 2012, 69 pages.

A. W. M. Smeulders et al., "Visual Tracking: An Experimental Survey," IEEE Transactions on Pattern Analysis and Machine Intelligence, vol. 36, No. 7, Jul. 2014, pp. 1442-1468.

A. Torralba et al., "Unbiased Look at Dataset Bias," Conference on Computer Vision and Pattern Recognition, Jun. 2011, pp. 1521-1528.

O. Zendel et al., "CV-HAZOP: Introducing Test Data Validation for Computer Vision," International Conference on Computer Vision, Dec. 2015, pp. 2066-2074.

D. Biedermann et al., "Evaluating Visual ADAS Components on the Congrats Dataset," 2016 IEEE Intelligent Vehicles Symposium (IV), Jun. 2016, 6 pages.

N. Schneider et al., "Pedestrian Path Prediction with Recursive Bayesian Filters: A Comparative Study," German Conference on Pattern Recognition Proceedings, Sep. 2013, 10 pages.

Github, "jsubercaze/simhashdb," https://github.com/jsubercaze/simhashdb, Accessed Apr. 22, 2022, 3 pages.

Wikipedia, "Capsule Neural Network," https://en.wikipedia.org/wiki/Capsule_neural_network, Feb. 28, 2022, 8 pages.

V. Kurama, "Capsule Networks: A Quick Primer," https://blog.paperspace.com/capsule-networks/, Jul. 17, 2020, 13 pages.

Geeks for Geeks, "Residual Networks (ResNet)—Deep Learning," https://www.geeksforgeeks.org/residual-networks-resnet-deep-learning/, Jan. 27, 2022, 16 pages.

T. Wang et al., "Dataset Distillation," arXiv:1811.10959v3, Feb. 24, 2020, 14 pages.

G. Hinton et al., "Distilling the Knowledge in a Neural Network," arXiv:1503.02531v1, Mar. 9, 2015, 9 pages.

S. Sabour et al., "Dynamic Routing Between Capsules," arXiv:1710.09829v2, Nov. 7, 2017, 11 pages.

Y. Lecun et al., "Gradient-Based Learning Applied to Document Recognition," Proceedings of the IEEE, Nov. 1998, 46 pages.

E. Strubell et al., "Energy and Policy Considerations for Deep Learning in NLP," Proceedings of the 57th Annual Meeting of the Association for Computational Linguistics, Jul. 28-Aug. 2, 2019, pp. 3645-3650.

R. Haeusler et al., "Synthesizing Real World Stereo Challenges," German Conference on Pattern Recognition Proceedings, Sep. 2013, pp. 164-173. Abstract Only.

U.S. Appl. No. 17/569,030 filed in the name of Zijia Wang et al. on Jan. 5, 2022, and entitled "Label Inheritance for Soft Label Generation in Information Processing System.".

U.S. Appl. No. 17/829,508 filed in the name of Zhen Jia et al. on Jun. 1, 2022, and entitled "Content Analysis and Retrieval Using Machine Learning.".

R. Haeusler et al., "Synthesizing Real World Stereo Challenges," German Conference on Pattern Recognition Proceedings, Sep. 2013, pp. 164-173.

* cited by examiner

METHOD, DEVICE, AND COMPUTER PROGRAM PRODUCT FOR IMAGE PROCESSING

RELATED APPLICATION(S)

The present application claims priority to Chinese Patent Application No. 202210874440.4, filed Jul. 22, 2022, and entitled "Method, Device, and Computer Program Product for Image Processing," which is incorporated by reference herein in its entirety.

FIELD

Embodiments of the present disclosure generally relate to the field of image processing, and in particular, to a method, a device, and a computer program product for image processing.

BACKGROUND

In recent years, with the ongoing development of increasingly advanced computer and network technologies, some computing tasks are generally implemented in edge devices or cloud servers of a network to provide services to users more quickly. Storage capacity is a key factor in evaluating the performance of the edge devices or cloud servers. However, in many cases, especially for an edge device, the storage space is limited. In these and other cases, the management of data, especially image data used for model training, is particularly important. For example, a data-intensive application such as autonomous driving has a large amount of image data to process, and the storage and management of image data also determine the performance of these applications. However, there are still many problems to be solved in the management of image data.

SUMMARY

Embodiments of the present disclosure provide a method, a device, and a computer program product for image processing.

According to a first aspect of the present disclosure, a method for image processing is provided. The method includes determining a group of composite images, a composite image in the group of composite images being composited from images of the same type in a plurality of images. The method further includes determining an image quality of an acquired target image based on the group of composite images. The method further includes processing the acquired target image based on the image quality.

According to a second aspect of the present disclosure, an electronic device is provided. The electronic device includes at least one processor; and a memory coupled to the at least one processor and having instructions stored therein, wherein the instructions, when executed by the at least one processor, cause the electronic device to perform actions including: determining a group of composite images, a composite image in the group of composite images being composited from images of the same type in a plurality of images; determining an image quality of an acquired target image based on the group of composite images; processing the acquired target image based on the image quality.

According to a third aspect of the present disclosure, a computer program product is provided. The computer program product is tangibly stored on a non-transitory computer-readable medium and includes machine-executable instructions, and the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Embodiments of the present disclosure will be described in more detail below with reference to the accompanying drawings. Although the drawings show some embodiments of the present disclosure, it should be understood that the present disclosure can be implemented in various forms, and should not be viewed as being limited to the embodiments described herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, when training various machine models by using sample images, the data volume of a sample image set is large. Although the data volume of the sample image set is already large, it is necessary to continuously add new sample images to the sample image set to ensure the accuracy of a trained model. However, as the number of images increases, the sample image set becomes increasingly larger, which increases the amount of time required for the training process. In addition, the newly added sample images may already have similar images in the sample image set. Using these images to train a machine model does not improve the model much, but wastes a lot of computing resources. In addition, the addition of some images to the sample image set will lead to increased noise when used for training a machine model, which is disadvantageous for the model training.

In order to solve the above and other potential problems, an embodiment of the present disclosure provides a method for image processing. In the method, a computing device determines a group of composite images, a composite image in the group of composite images being composited from images of the same type in a plurality of images. The computing device then determines an image quality of an acquired target image by using the group of composite images. Next, the computing device implements the management of the acquired target image based on the image quality. Through the method, the storage and management of image data are improved, the effective utilization rate of data is improved, and the consumption of resources is reduced.

Figure 1:
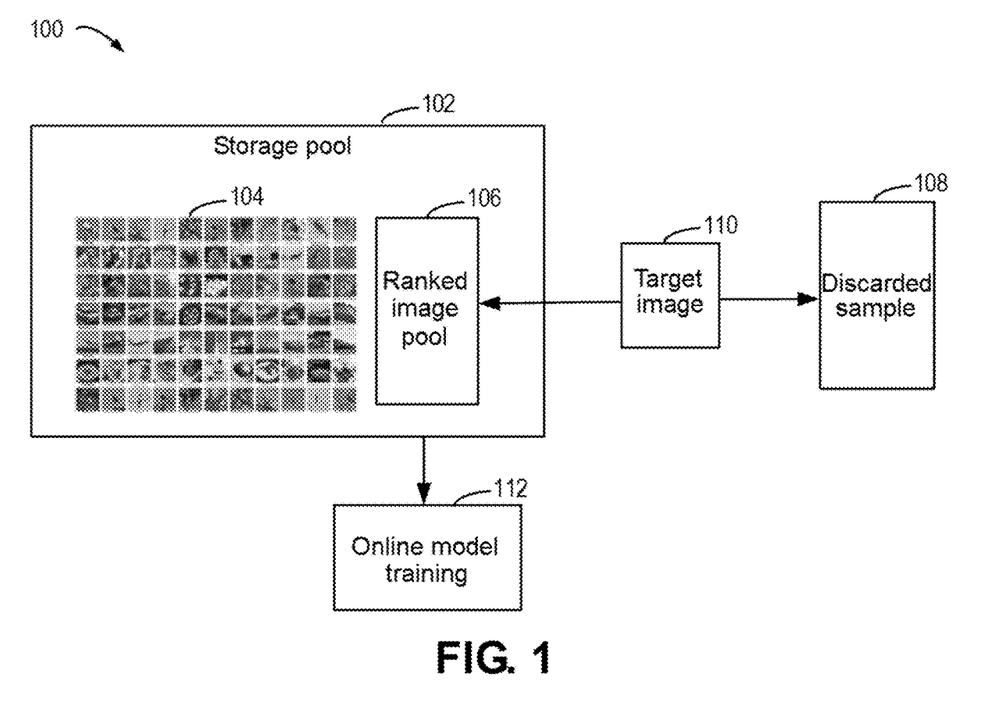
FIG. 1 illustrates a schematic diagram of an example environment in which a device and/or a method according to embodiments of the present disclosure can be implemented.

Embodiments of the present disclosure will be further described in detail with reference to the accompanying drawings below. FIG. 1 shows an example environment 100 in which a device and/or a method according to embodiments of the present disclosure can be implemented.

In environment 100, storage pool 102 stores original sample image set 104 used for model training. Original sample image set 104 may be used for training various suitable machine models, for example, a machine learning model for image classification or a machine learning model for object recognition. Storage pool 102 further has ranked image pool 106 used for ranking, according to image qualities, sample images received subsequent to original sample image set 104 and then storing the ranked sample images according to the rankings.

If target image 110 is received, quality evaluation needs to be performed for target image 110. Then, based on a result of the quality evaluation, it is decided whether to retain the target image 110. If target image 110 is retained, it is placed in ranked image pool 106 or classified as discarded sample 108. If target image 110 is not retained, it is classified as discarded sample 108 to be discarded or to be stored in some external storage devices. Original sample image set 104 in the storage pool 102 and the samples in the ranked image pool 106 are used for on-line model training 112.

Figure 2:
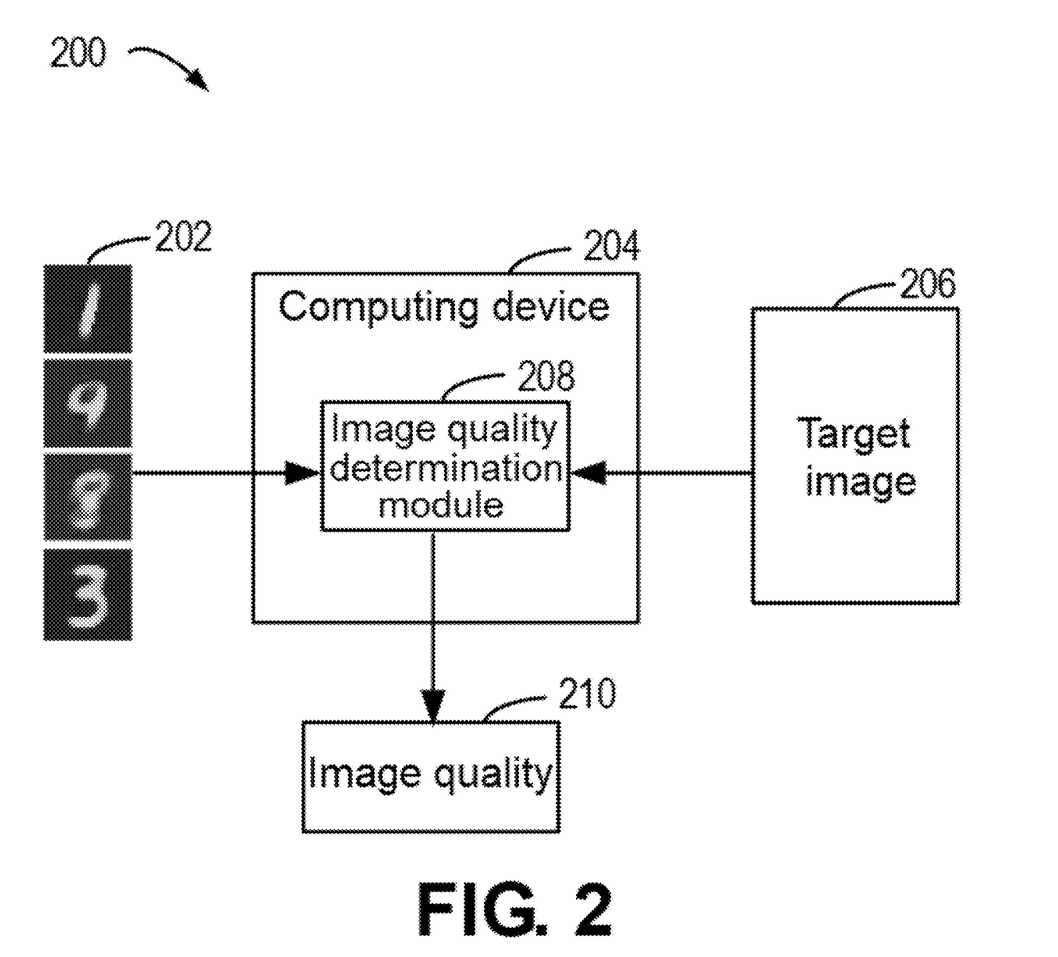
FIG. 2 illustrates a schematic diagram of an example process for image processing according to an embodiment of the present disclosure.

An example environment 100 in which a device and/or a method according to embodiments of the present disclosure can be implemented has been described above in FIG. 1. A process for image processing will be further described below with reference to FIG. 2. FIG. 2 illustrates a schematic diagram 200 of a process for image processing according to an embodiment of the present disclosure.

As shown in FIG. 2, computing device 204 is configured to manage a sample image set used for training a machine model. For example, a sample image set in storage pool 102 in FIG. 1 includes an original sample image set and sample images in a ranked storage pool.

An example of computing device 204 includes, but is not limited to, a personal computer, a server computer, a handheld or laptop device, a mobile device (such as a mobile phone, a personal digital assistant (PDA), and a media player), a multiprocessor system, a consumer electronic product, a small computer, a mainframe computer, a distributed computing environment including any of the above systems or devices, and the like.

Computing device 204 receives a group of composite images 202. A composite image in the group of composite images is generated by compositing, for example, images of the same type in the original sample image set 104 in storage pool 102 in FIG. 1. For example, in the original sample image set for training a machine model for distinguishing digits 0 to 9, images in the sample images which are respectively classified into different digits may be composited into respective composite images. For example, a composite image may be generated from an image subset classified as digit 1, and a composite image may be generated from images classified as digit 2. The above examples are only for describing the present disclosure, rather than specifically limiting the present disclosure. An original sample image set used for another classification model may also be processed to obtain a group of composite images, for example, an original image set used for training classification of different animals is processed to obtain a group of composite images.

FIG. 2 shows computing device 204 receiving a group of composite images 202 generated by another computing device based on the original sample image set, which is merely an example, rather than specifically limiting the present disclosure. Computing device 204 may also process the original sample image set to generate the group of composite images 202.

In some embodiments, computing device 204 or another computing device processes the original sample image set by using a data distillation algorithm to obtain a group of composite images. The computing device may perform data distillation on the original sample image set to obtain a group of composite images, each composite image corresponding to a category to which the composite image is to be classified. Information on images that may be classified into that category is integrated into the composite image. In some embodiments, the computing device processes the original sample image set by using a capsule network model, for utilizing corresponding capsules to obtain a corresponding group of composite images. Each composite image is a visual representation of information within a capsule.

After obtaining the group of composite images, computing device 204 determines, by using the group of composite images 202, whether acquired target image 206 can be added to the sample image set. Computing device 204 compares acquired target image 206 with the group of composite images 202, in an image quality determination module 208, to determine image quality 210 of target image 206 with respect to the group of composite images 202. Computing device 204 then determines, based on image quality 210, whether to keep the target image or discard the target image.

Through the method, the storage and management of image data are improved, the effective utilization rate of data is improved, and the consumption of resources is reduced.

A schematic diagram of a process for image processing according to an embodiment of the present disclosure has been described above with reference to FIG. 2. An example process 300 for image processing according to an embodiment of the present disclosure will be described below with reference to FIG. 3.

Figure 3:
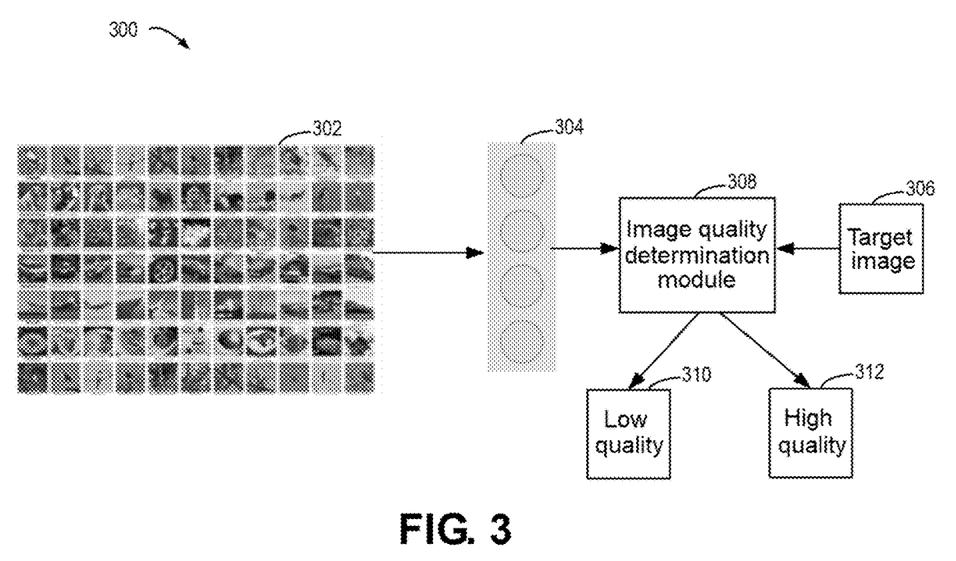
FIG. 3 illustrates a schematic diagram of an example process for image processing according to an embodiment of the present disclosure.

As shown in FIG. 3, original sample image set 302 includes various images that may be used for training a machine model. In one example, the machine model to be trained is a classification model. In another example, the machine model to be trained is an object recognition model. The above examples are intended to describe the present disclosure only and are not specific limitations to the present disclosure.

Next, the computing device receives target image 306 to be added to the sample image set. A distillation operation is performed on the original sample image set to obtain a group of composite images 304, and image quality determination module 308 within a corresponding computing device, such as computing device 204 or another computing device, is used to compare target image 306 with the group of composite images 304 to determine the quality of the target image 306. If the target image is classified as high quality 312, the sample image is retained. If the target image is classified as low quality 310, the target image is discarded.

An example process 300 for image processing according to an embodiment of the present disclosure has been described above with reference to FIG. 3. A flow chart of a method 400 for image processing according to an embodiment of the present disclosure will be described below with reference to FIG. 4. The method 400 may be performed at computing device 204 in FIG. 2 or another computing device.

Figure 4:
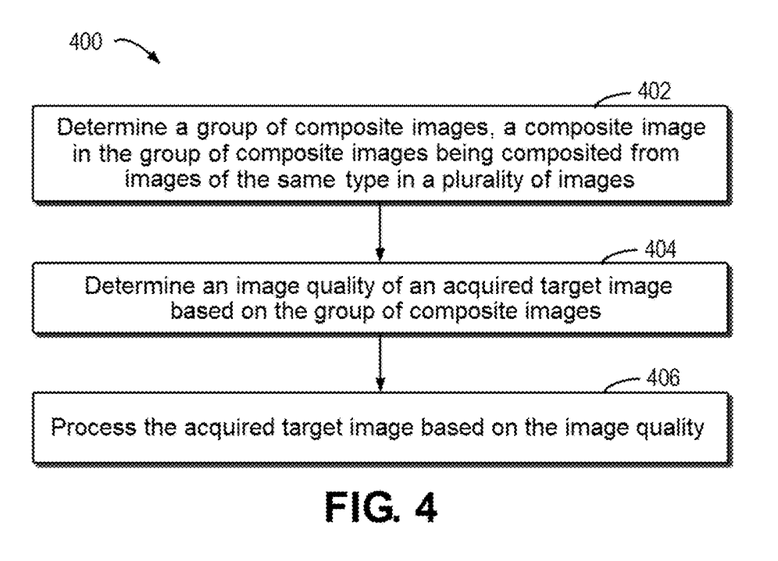
FIG. 4 illustrates a flow chart of a method for image processing according to an embodiment of the present disclosure.

At block 402, a group of composite images is determined, a composite image in the group of composite images being composited from images of the same type in a plurality of images. For example, computing device 204 is configured to acquire the group of composite images, and the group of composite images is generated from a plurality of images used for machine model training. The plurality of images are the original sample image set or a subgroup of the original sample image set.

In some embodiments, computing device 204 acquires a group of composite images from another computing device. In some embodiments, computing device 204 needs to acquire a plurality of images first and then perform data distillation on the plurality of images to obtain a group of composite images. In this way, the composite images may be acquired quickly and in a timely manner. In some embodiments, the computing device needs to acquire a capsule network model first when performing data distillation on a plurality of images. The capsule network model is then applied to the plurality of images to obtain a group of composite images. After inputting the plurality of images into the capsule network model for training, a composite image may be generated from capsule information in the capsule network model. In this way, a composite image related to the plurality of images may be acquired quickly and accurately.

At block 404, an image quality of the acquired target image is determined based on the group of composite images. Computing device 204 processes the group of composite images and the target image to obtain an image quality of the target image, for determining how to process the target image.

In some embodiments, the computing device first determines a similarity between the acquired target image and each composite image in the group of composite images. In one example, a similarity between target image i and one composite image j in the group of composite images is calculated by the following formula (1):

$$sim<i,j> = \sum_{I \in i, J \in j} p_I \log p_J \quad (1)$$

where $p_I$ is a pixel value of pixel I in image i, and $p_J$ is a pixel value of pixel J in image j. A similarity between the two images is determined by using all pixel values of image i and image j. In another example, the similarity sim <i,j> may also be a cosine similarity between the two images. The above examples are intended to describe the present disclosure only and are not specific limitations to the present disclosure. A person skilled in the art may obtain the similarity by using any suitable manner.

Next, the computing device performs an addition operation on a group of similarities between the target image and the group of composite images. The computing device then determines a result of the addition operation as the image quality of the target image with respect to the group of composite images. For example, the computing device determines a weight $w_{i,j}$ between target image i and composite image j by the following formula (2):

$$w_{i,j} = sim<i,j> \quad (2)$$

Then, a quality score of target image i with respect to the group of composite images $P_{set}$ may be determined by the following formula (3):

$$S_i = \sum_{j \in P_{set}} w_{i,j} \quad (3)$$

The quality score acquired by the above formula may be used for measuring the quality of the target image. In another example, the quality of the target image may also be represented by a different quality grading. The above examples are intended to describe the present disclosure only and are not specific limitations to the present disclosure. Those skilled in the art may use any suitable manner to determine the image quality of the target image with respect to the group of composite images.

At block 406, the acquired target image is processed based on the image quality. After acquiring the image quality of the target image, the computing device processes the target image according to the image quality.

In some embodiments, the image quality is represented as a quality level. The computing device compares the quality level with a threshold level when processing the acquired target image. If it is determined that the quality level exceeds the threshold level, the computing device retains the acquired target image, and stores it in a storage pool as a sample that may be used for training a machine model. If it is determined that the quality level is lower than or equal to the threshold level, the acquired target image is discarded. In this way, useful images may be added to sample images, the number of useless sample images may be reduced, and resource consumption may be reduced.

In some embodiments, when the computing device provides sample images for model training, the retained images are further processed. For example, the computing device determines a ranking of the acquired target images based on the quality levels. This process implements ranking of the obtained images to be retained. If it is required to select data for model training, top-ranked images may be selected from the ranked images first. For example, the ranking of an image is compared with a threshold ranking. If the ranking is determined to precede the threshold ranking, it is determined that the image corresponding to the ranking may be used for training a machine model online. For example, a training sample image set $D_S = \{x_s \in S, y_u\}$ is selected from the original sample image set and the ranked image pool, $S \in X_R$, where $y_u$ denotes the original sample image set, $X_R$ denotes a new sample image set obtained by utilizing the composite images, S is a set formed by images in $X_R$, $x_s$ is images in set S, for example, a plurality of top-ranked images selected from the ranked image pool. Alternatively or additionally, the machine model is trained online at the computing device using the acquired target image, so as to reduce a loss value of the machine model. In this way, by using the top-ranked images for model training, the loss of the machine model is reduced, and the accuracy is improved.

For example, an on-line learning dataset is $D_S=\{x_s,y\}$, which is used for training a machine model, where $x_s$ is an image in set S, such as a selected sample image ranked in the front, and y is the original sample image set, so as to minimize the following loss:

$$L = \min_w \sum_{i \in P_{newset}} L_i \times S_i \tag{4}$$

where min represents the minimization, w represents a parameter of the trained model, $P_{newset}$ is a new image set formed by sample images in $x_s$, i represents an image in $P_{newset}$, $L_i$ is a loss value obtained by image i in the model training process, and $S_i$ is a quality score of image i.

In some embodiments, when saving the image, the computing device further stores the acquired target image and the corresponding quality level according to the ranking. Through this storage method, the stored data may be ordered, which is convenient for retrieval and search.

Through the method, the storage and management of image data are improved, the effective utilization rate of data is improved, and the consumption of resources is reduced.

The use of the capsule network model to obtain a group of composite images has been described above, and the training of the capsule network model will be described below. The capsule network model may be used for processing the original sample image set to obtain a group of composite images. When using the capsule network model, a corresponding loss function may be set for training. A mutual information item shown in the following formula (5) is set in the loss function of the capsule network model to ensure that the composite image may include as much meta-information in the image samples as possible:

$$I(X, Z) = \int\int p(z \mid x)\, \hat{p}(x) \log \frac{p(Z \mid X)}{p(z)} dx dz \tag{5}$$

where X is the original sample image set, Z is a composite image set, z is a composite image in the composite image set, x is a sample image in original sample image set, $\hat{p}(x)$ is a feature distribution of the original sample image set, $p(z)=\int p(z|x)\hat{p}(x)dx$, and $p(z|x)$ is a probability generated for the composite image z based on the sample image x. A good composite image $z \in Z$ should meet $p(z|x)=\max_{p(z|x)} I(X, Z)$, where max refers to taking the maximum value.

In some implementations, computing device 204 utilizes the capsule network model to process the original sample image set or a subset thereof such that the number of identical features included in composite images corresponding to different classifications is lower than a predetermined threshold. In such an embodiment, in order to enable the classification capsules or composite images to include relatively independent features, that is, enable the classification capsules to include as few common features as possible, an orthogonal loss item as shown in the following formula (6) set in the loss function may be used for training:

$$L_{or} = \sum_{i,j \in Z} \langle i, j \rangle \tag{6}$$

where $\langle i, j \rangle$ is a cosine similarity between samples i and j in the composite image set Z.

In some embodiments, the capsule network model may be trained using the loss function represented by the following formula (7):

$$L=L_{or}(Z)-I(X,Z) \tag{7}$$

where $L_{or}(Z)$ is obtained by formula (6), and $I(X, Z)$ is obtained by formula (5).

In this way, it can be ensured that the composite image can include as much meta-information in the image samples as possible, and at the same time, it can be ensured that the composite images include as few common features as possible.

Figure 5:
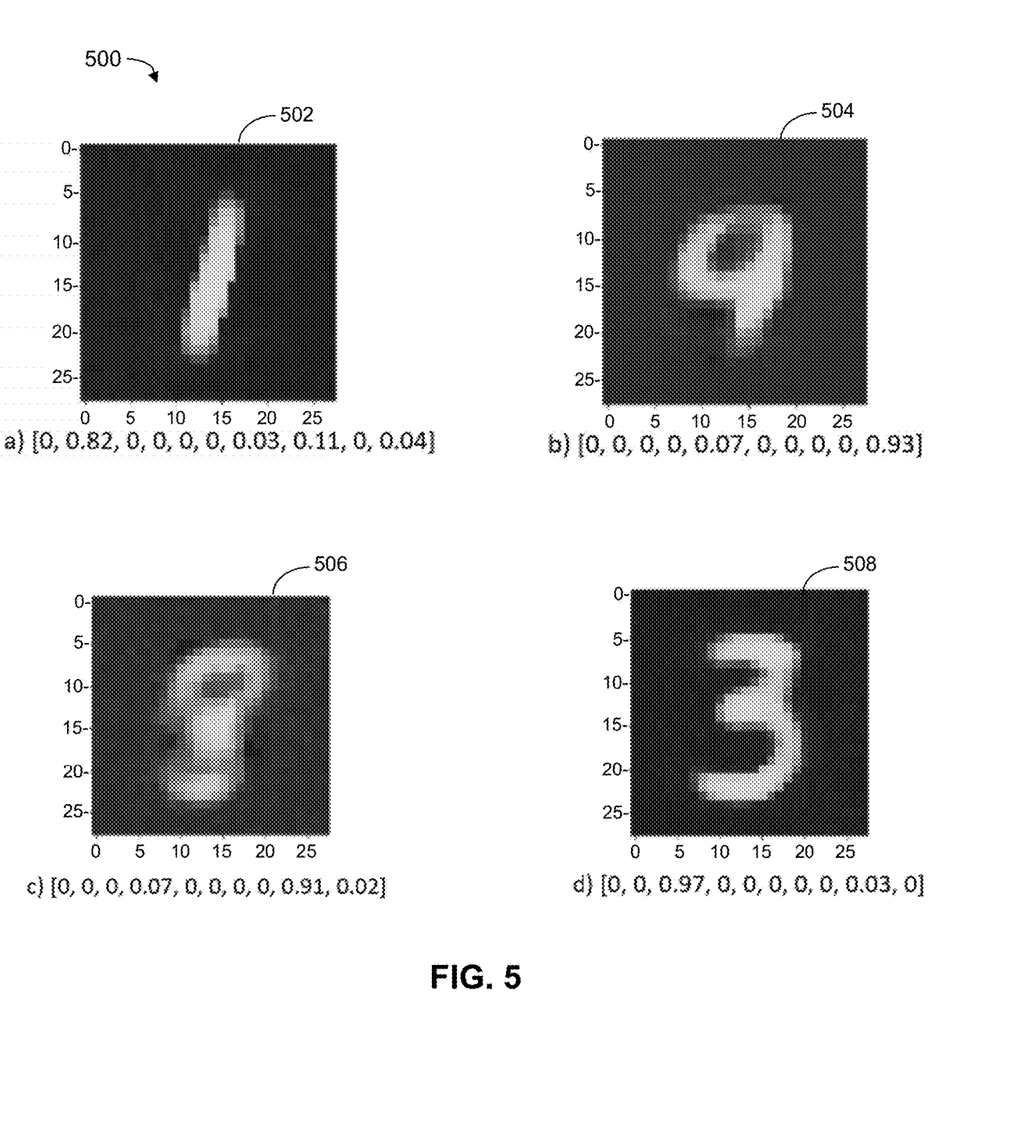
FIG. 5 illustrates a schematic diagram of an example of composite images according to an embodiment of the present disclosure.

Using the above method, after training a capsule neural network with a classification task on the original sample image set, the capsules in the trained network are extracted, and these capsules may be visualized as composite images. For example, FIG. 5 shows example 500 of composite images according to an embodiment of the present disclosure. Images 502, 504, 506, and 508 are visualized images of capsules extracted from the capsule neural network. In an embodiment of the present disclosure, a corresponding soft label may further be provided for each composite image in a group of composite images. The soft labels represent probabilities that the composite image belongs to a plurality of sample images used for training the capsule network model. For example, the soft label below image 502 is [0, 0.82, 0, 0, 0, 0, 0.03, 0.11, 0, 0.04], which represents probabilities that the composite image is original sample digit images 0 to 9. The process of determining the soft label will be described in detail below with reference to FIG. 6.

Figure 6:
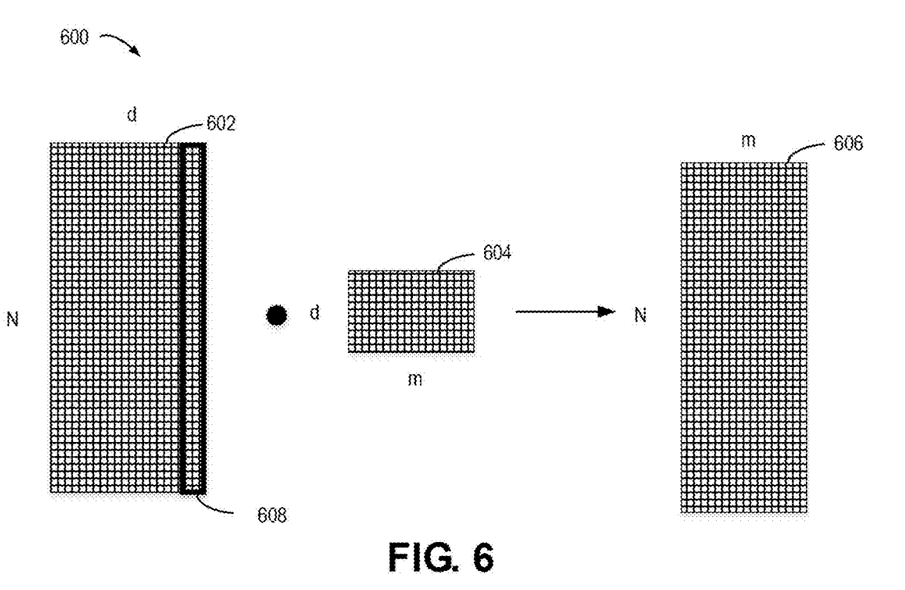
FIG. 6 illustrates a schematic diagram of an example of determining a label of a sampling image according to an embodiment of the present disclosure.

FIG. 6 illustrates a schematic diagram 600 of an example of determining a label of a sample image according to an embodiment of the present disclosure. As shown in FIG. 6, an original sample image training set includes N image samples. After the training is completed, classification capsules in the trained capsule network model are extracted to form a composite image set, and feature matrix 604 of the composite image set is acquired at the same time. The number of composite images in the composite image set is d, and each composite image is an m-dimensional feature vector; therefore, feature matrix 604 of the composite image set is d×m-dimensional, where d and m are natural numbers greater than zero. Then, feature matrix 604 of the composite image set is multiplied by N×d correlation matrix 602 to obtain image feature matrix 606 of the original sample image set, and image feature matrix 606 is N×m. Each element in correlation matrix 602 corresponds to a correlation between the composite image and an original sample image in the original sample image set.

In order to be able to calculate correlation matrix 602, correlation matrix 602 is initialized, for example, correlation matrix 602 is made to be an N×d identity matrix. Afterwards, feature matrix 604 of the composite image set can be obtained. A classification model is then used for training the original sample image set to obtain image feature matrix 606 which is also N×m-dimensional, and then correlation matrix 602 is obtained from image feature matrix 606 and feature matrix 604 of the composite image set. Columns in correlation matrix 602 are correlation vectors 608 for the composite images. Correlation vector 608 indicates a correlation of a composite image to each sample image, thereby obtaining a soft label for each composite image.

Figure 7:
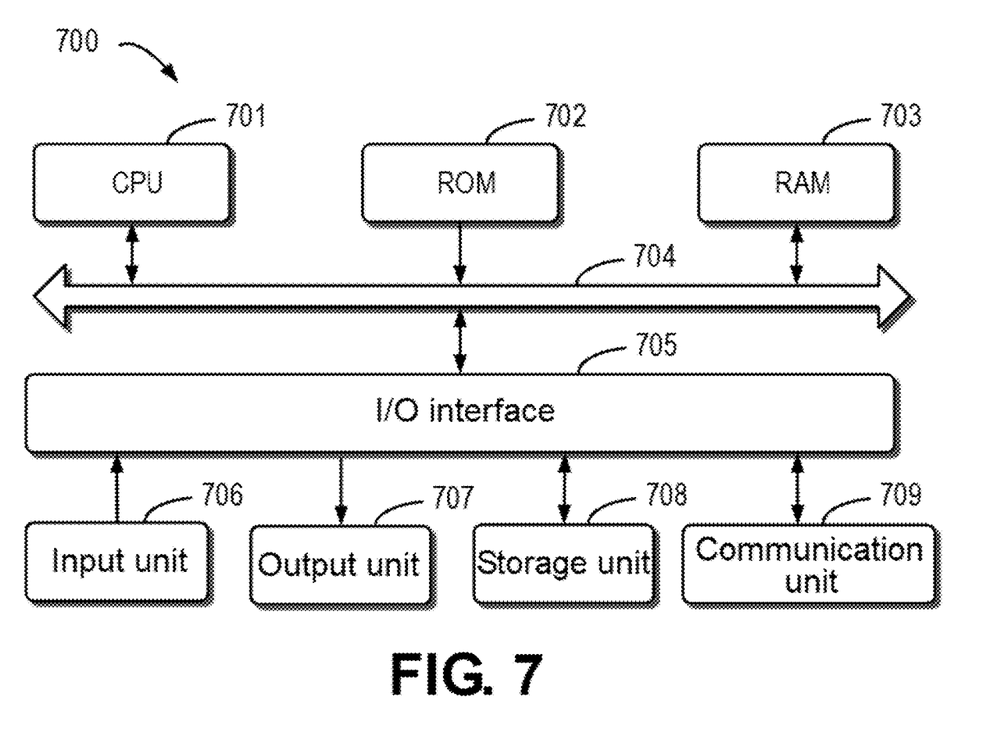
FIG. 7 illustrates a block diagram of an example device suitable for implementing embodiments of the present disclosure.

FIG. 7 shows a schematic block diagram of example device 700 that can be used to implement embodiments of the present disclosure. Computing device 204 in FIG. 2 may be implemented by using device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing procedures described above, such as method 400, may be performed by CPU 701. For example, in some embodiments, method 400 may be implemented as a computer software program that is tangibly included in a machine-readable medium such as the storage unit 708. In some embodiments, part or all of the computer program may be loaded and/or installed onto device 700 via ROM 702 and/or communication unit 709. One or more actions of method 400 described above may be performed when the computer program is loaded into RAM 703 and performed by CPU 701.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and the technical improvements associated therewith, so as to enable persons of ordinary skill in the art to understand the embodiments disclosed herein.

What is claimed is:

1. A method for image processing, comprising:
   determining, in a processor-based machine learning system, a group of composite images, a composite image in the group of composite images being composited from images of the same type in a plurality of images, the group of composite images comprising at least a first composite image generated from a first subset of the plurality of images each having a first classification, and a second composite image, different than the first composite image and generated from a second subset of the plurality of images each having a second classification different than the first classification, wherein the first and second subsets of the plurality of images are part of a sample image set;
   determining, in the processor-based machine learning system, an image quality of an acquired target image, for potential addition to the sample image set, based on the group of composite images, the image quality being determined at least in part based on similarity metrics computed utilizing pixel values of the acquired target image and pixel values of respective ones of the composite images;
   processing, in the processor-based machine learning system, the acquired target image based on the image quality, wherein processing the acquired target image based on the image quality further comprises controlling inclusion of the acquired target image in the sample image set at least in part as a function of the image quality, to provide an updated sample image set; and
   training, in the processor-based machine learning system, at least one machine learning model utilizing the updated sample image set.

2. The method according to claim 1, wherein determining the group of composite images comprises:
   acquiring the plurality of images; and
   performing data distillation on the plurality of images to obtain the group of composite images.

3. The method according to claim 2, wherein performing the data distillation on the plurality of images comprises:
   acquiring a capsule network model; and
   obtaining the group of composite images by applying the capsule network model to the plurality of images.

4. The method according to claim 1, wherein determining the image quality comprises:
   determining a similarity between the acquired target image and each composite image in the group of composite images;
   performing an addition operation on a group of similarities between the target image and the group of composite images; and
   determining a result of the addition operation as the image quality of the target image with respect to the group of composite images.

5. The method according to claim 1, wherein the image quality is expressed as a quality level; and processing the acquired target image comprises:
   comparing the quality level with a threshold level; and
   retaining the acquired target image responsive to determining that the quality level exceeds the threshold level.

6. The method according to claim 5, wherein processing the acquired target image further comprises:
   discarding the acquired target image responsive to determining that the quality level is lower than or equal to the threshold level.

7. The method according to claim 5, further comprising:
   determining a ranking of the acquired target images based on the quality level;
   comparing the ranking with a threshold ranking; and
   determining that the acquired target image is able to be used to train the at least one machine learning model responsive to determining that the ranking precedes the threshold ranking.

8. The method according to claim 7, further comprising:
   training the at least one machine learning model online by using the acquired target image to reduce a loss value of the at least one machine learning model.

9. The method according to claim 7, further comprising:
   storing the acquired target image and the corresponding quality level according to the ranking.

10. An electronic device, comprising:
    at least one processor; and
    a memory coupled to the at least one processor and having instructions stored therein, wherein the instructions, when executed by the at least one processor, cause the electronic device to perform actions comprising:

determining, in a processor-based machine learning system, a group of composite images, a composite image in the group of composite images being composited from images of the same type in a plurality of images, the group of composite images comprising at least a first composite image generated from a first subset of the plurality of images each having a first classification, and a second composite image, different than the first composite image and generated from a second subset of the plurality of images each having a second classification different than the first classification, wherein the first and second subsets of the plurality of images are part of a sample image set;

determining, in the processor-based machine learning system, an image quality of an acquired target image, for potential addition to the sample image set, based on the group of composite images, the image quality being determined at least in part based on similarity metrics computed utilizing pixel values of the acquired target image and pixel values of respective ones of the composite images;

processing, in the processor-based machine learning system, the acquired target image based on the image quality, wherein processing the acquired target image based on the image quality further comprises controlling inclusion of the acquired target image in the sample image set at least in part as a function of the image quality, to provide an updated sample image set; and training, in the processor-based machine learning system, at least one machine learning model utilizing the updated sample image set.

11. The electronic device according to claim 10, wherein determining the group of composite images comprises:
acquiring the plurality of images; and
performing data distillation on the plurality of images to obtain the group of composite images.

12. The electronic device according to claim 11, wherein performing data distillation on the plurality of images comprises:
acquiring a capsule network model; and
obtaining the group of composite images by applying the capsule network model to the plurality of images.

13. The electronic device according to claim 10, wherein determining the image quality comprises:
determining a similarity between the acquired target image and each composite image in the group of composite images;
performing an addition operation on a group of similarities between the target image and the group of composite images; and
determining a result of the addition operation as the image quality of the target image with respect to the group of composite images.

14. The electronic device according to claim 10, wherein the image quality is expressed as a quality level; and processing the acquired target image comprises:
comparing the quality level with a threshold level; and
retaining the acquired target image responsive to determining that the quality level exceeds the threshold level.

15. The electronic device according to claim 14, wherein processing the acquired target image further comprises:

discarding the acquired target image responsive to determining that the quality level is lower than or equal to the threshold level.

16. The electronic device according to claim 14, wherein the actions further comprise:
determining a ranking of the acquired target images based on the quality level;
comparing the ranking with a threshold ranking; and
determining that the acquired target image is able to be used to train the at least one machine learning model responsive to determining that the ranking precedes the threshold ranking.

17. The electronic device according to claim 16, wherein the actions further comprise:
training the at least one machine learning model online by using the acquired target image to reduce a loss value of the at least one machine learning model.

18. The electronic device according to claim 16, wherein the actions further comprise:
storing the acquired target image and the corresponding quality level according to the ranking.

19. A computer program product comprising a non-transitory computer-readable medium having machine-executable instructions stored therein, wherein the machine-executable instructions, when executed by a machine, cause the machine to perform a method for image processing, the method comprising:

determining, in a processor-based machine learning system, a group of composite images, a composite image in the group of composite images being composited from images of the same type in a plurality of images, the group of composite images comprising at least a first composite image generated from a first subset of the plurality of images each having a first classification, and a second composite image, different than the first composite image and generated from a second subset of the plurality of images each having a second classification different than the first classification, wherein the first and second subsets of the plurality of images are part of a sample image set;

determining, in the processor-based machine learning system, an image quality of an acquired target image, for potential addition to the sample image set, based on the group of composite images, the image quality being determined at least in part based on similarity metrics computed utilizing pixel values of the acquired target image and pixel values of respective ones of the composite images;

processing, in the processor-based machine learning system, the acquired target image based on the image quality, wherein processing the acquired target image based on the image quality further comprises controlling inclusion of the acquired target image in the sample image set at least in part as a function of the image quality, to provide an updated sample image set; and training, in the processor-based machine learning system, at least one machine learning model utilizing the updated sample image set.

20. The computer program product according to claim 19, wherein determining the group of composite images comprises:
acquiring the plurality of images; and
performing data distillation on the plurality of images to obtain the group of composite images.

* * * * *